United States Patent
Rathi et al.

(10) Patent No.: US 10,833,982 B2
(45) Date of Patent: Nov. 10, 2020

(54) SERVER-SIDE PATH SELECTION IN MULTI VIRTUAL SERVER ENVIRONMENT

(71) Applicant: International Business Machines Corporation, Armonk, NY (US)

(72) Inventors: Sanket Rathi, Hyderabad (IN); Vamshikrishna Thatikonda, Hyderabad (IN); Venkata Naga Seshaiah Anumula, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 16/204,159

(22) Filed: Nov. 29, 2018

(65) Prior Publication Data

US 2020/0177499 A1 Jun. 4, 2020

(51) Int. Cl.
| | | |
|---|---|---|
| H04L 12/26 | (2006.01) | |
| H04L 12/703 | (2013.01) | |
| H04L 12/707 | (2013.01) | |
| H04L 29/08 | (2006.01) | |
| H04L 12/24 | (2006.01) | |
| H04L 12/935 | (2013.01) | |

(52) U.S. Cl.
CPC .......... *H04L 45/28* (2013.01); *H04L 41/0663* (2013.01); *H04L 41/12* (2013.01); *H04L 45/22* (2013.01); *H04L 45/24* (2013.01); *H04L 49/3045* (2013.01); *H04L 67/2842* (2013.01)

(58) Field of Classification Search
CPC .... G06F 13/18; G06F 13/122; G06F 13/1663; G06F 9/45; G06F 9/46; G06F 13/00; G06F 13/12; G06F 13/28; G06F 12/08; G06F 15/16; G06F 9/455; H04L 12/56; H04L 12/54; H04L 45/28; H04L 12/703; H04L 12/707; H04L 12/935; H04L 12/24; H04L 29/08
USPC ....................................................... 370/216
See application file for complete search history.

(56) References Cited

U.S. PATENT DOCUMENTS

| | | | | |
|---|---|---|---|---|
| 6,453,392 B1 * | 9/2002 | Flynn, Jr. | .............. | G06F 3/0619 409/104 |
| 6,904,477 B2 * | 6/2005 | Padmanabhan | ....... | G06F 3/0617 710/74 |
| 6,973,529 B2 * | 12/2005 | Casper | .................... | G06F 13/28 709/239 |
| 7,793,139 B2 * | 9/2010 | Jain | ....................... | G06F 9/5077 714/4.2 |

(Continued)

OTHER PUBLICATIONS

Bafna et al. "A Method to Handle Cache Coherency from a Guest when it has Caching Enabled from Multiple I/O Domains", An IP.com Prior Art Database Technical Disclosure, IP.com No. IPCOM000228086D, IP.com, Electronic Publication Date: Jun. 5, 2013, 5 pages.

*Primary Examiner* — Man U Phan
(74) *Attorney, Agent, or Firm* — Joseph P. Curcuru

(57) ABSTRACT

Embodiments describe an approach for improving path selection in multi-virtual input/output sever environment. Embodiments, send one or more inquiry commands to one or more virtual input/output server's (VIOSs). Further, embodiments, receive one or more server-side cache properties from the one or more VIOSs. Additionally, embodiments, determine one or more preferred paths based on the one or more server-side cache properties, and perform one or more input/output's (I/O's) on the one or more preferred paths.

20 Claims, 5 Drawing Sheets

(56) References Cited

U.S. PATENT DOCUMENTS

| | | | | |
|---|---|---|---|---|
| 7,930,416 B2* | 4/2011 | Miller | ............... | G06Q 10/06 |
| | | | | 709/229 |
| 8,019,966 B2* | 9/2011 | Nevarez | ............... | G06F 11/2092 |
| | | | | 711/147 |
| 8,041,987 B2* | 10/2011 | Allen | ............... | G06F 11/2005 |
| | | | | 714/4.11 |
| 8,281,306 B2* | 10/2012 | Logan | ............... | G06F 11/0712 |
| | | | | 718/1 |
| 8,458,413 B2* | 6/2013 | Ganti | ............... | G06F 12/08 |
| | | | | 707/655 |
| 8,495,412 B2* | 7/2013 | Pafumi | ............... | G06F 11/2005 |
| | | | | 714/4.1 |
| 8,521,922 B2* | 8/2013 | Haustein | ............... | G06F 3/061 |
| | | | | 710/2 |
| 8,902,736 B2* | 12/2014 | Yadav | ............... | H04L 45/28 |
| | | | | 370/217 |
| 9,262,351 B2* | 2/2016 | Keeriyadath | ............... | G06F 13/18 |
| 9,800,459 B1 | 10/2017 | Fair | | |
| 2012/0066543 A1 | 3/2012 | Pafumi et al. | | |

* cited by examiner

SERVER-SIDE PATH SELECTION IN MULTI VIRTUAL SERVER ENVIRONMENT

BACKGROUND OF THE INVENTION

The present invention relates generally to the field of storage virtualization, and more particularly to managing the storage path between virtual disks and client logical partitions (LPARs) based on identified cache properties.

Server-side caching software provides the capability to cache storage data of target disks from a Storage Area Network (SAN) to faster flash disks (e.g., solid-state disk (SSD), non-volatile memory express (NVMe), etc.) on a server. Based on storage data access patterns of an application, a caching algorithm identifies the most frequently accessed data, i.e., "hot data," and caches the hot data on a cache disk. All future read requests for the hot data are served from the cached data on the cache disk, improving application read performance. Further, the caching software monitors write operations and invalidates the cache before write data is sent to the SAN.

SUMMARY

Embodiments of the present invention disclose a method, a system, and a computer program product for improving path selection in multi-virtual input/output server environment. Embodiments of the present invention discloses sending, by one or more processors, one or more inquiry commands to one or more virtual input/output server's (VIOSs). Receiving, by said one or more processors, one or more server-side cache properties from said one or more VIOSs. Determining, by said one or more processors, one or more preferred paths based on said one or more server-side cache properties, and performing, by said one or more processors, one or more input/outputs (I/Os) on said one or more preferred paths.

Embodiments of the present invention disclose a method, a system, and a computer program product for improving path selection in multi-virtual input/output server environment. Embodiments of the present invention discloses detecting, by said one or more processors, path failure in one or more paths. Marking, by said one or more processors, said one or more detected failed paths. Marking, by said one or more processors, said cache on said detected one or more failed paths. Sending, by said one or more processors, one or more cache invalidation requests to one or more virtual input/output servers (VIOSs). Clearing, by said one or more processors, said marked cache and said cache invalidation requests on said one or more failed paths, and failing over, by said one or more processors, said one or more I/O's onto said next preferred path.

DETAILED DESCRIPTION

Figure 1A:
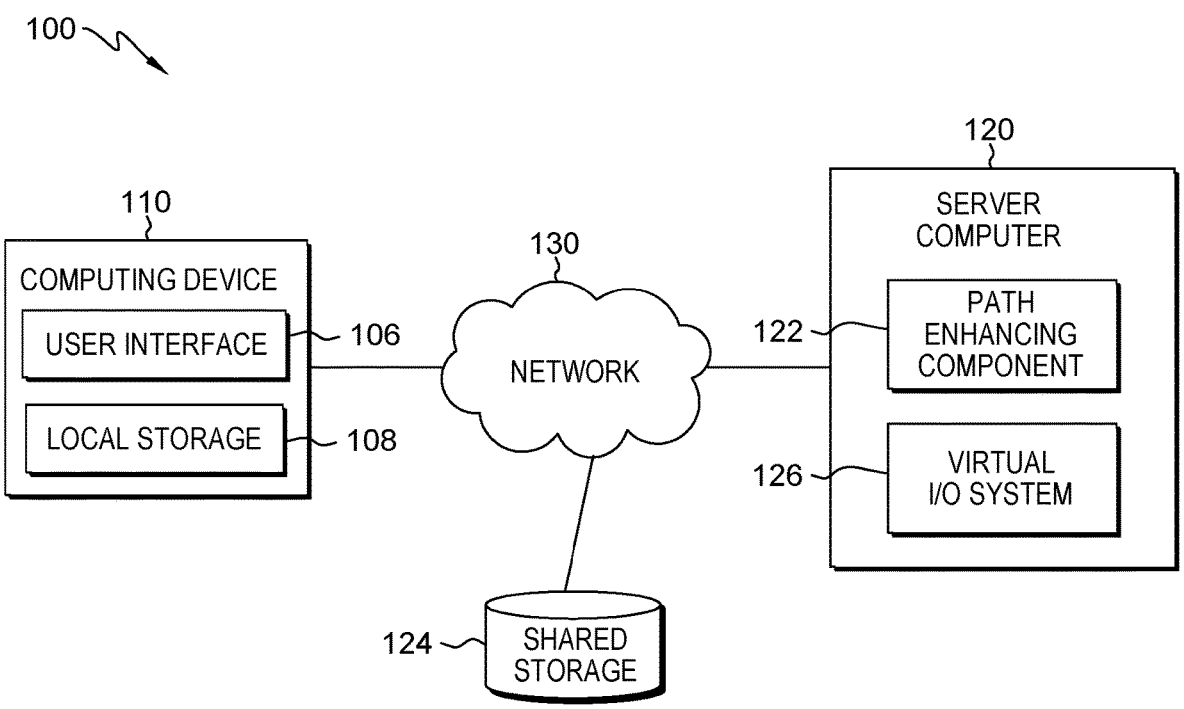
FIG. 1A is a functional block diagram illustrating a distributed data processing environment, in accordance with an embodiment of the present invention.

In a virtualized environment (e.g., a power system virtualized environment (PSVE)), a Virtual Input/Output Server (VIOS) is responsible for storage virtualization to client logical partitions (LPARs), wherein the storage can be virtualized to a client through multiple VIOSs creating a multipath high-availability environment. For client virtual disks, a VIOS emulates small computer system interface (SCSI) targets and supports SCSI primary commands such as, but not limited to, inquiry, mode sense, mode select, etc. For example, a response for these commands is prepared by a VIOS. In a PSVE, the VIOS can implement server-side caching for virtualized disks that are mapped to client LPARs. If server-side caching is enabled for a virtual disk, then the VIOS will use a flash device to cache "hot" data of the virtual disk. However, not all VIOSs in a high availability multipath environment can have server-side caching enabled. It is important to note that server-side cache properties and cache properties have the same meaning and can be used interchangeably.

Currently, there is no method to identify cache properties for a virtualized disk such as, but not limited to: whether cache is enabled for one or more virtualized disks, the amount of cache available for a virtualized disk, latency of one or more caching disks, the bandwidth of the one or more cache disk, etc. In embodiments of the present invention, on the server-side cache environment, when a path fails over from one VIOS to another VIOS, the cache can be invalidated at the first VIOS because the data cached at the first VIOS can be updated through the fail over path. Embodiments of the present invention can identify one or more preferable paths between one or more VIOSs that have a server-side cache, do not have a server-side cache, and/or a less preferable cache.

Embodiments of the present invention can retrieve server-side cache properties of a virtualized disk from a VIOS, these embodiments can give one or more clients the flexibility to determine one or more preferred input/output (IO) paths and also provide a method to invalidate the cache at the failed path's VIOS. For example, a client retrieves server-side cache properties from a VIOS on each path by sending inquiry commands to vendor specific inquiry pages. It should be noted that a client can be computer hardware or software that accesses a service made available by a server.

In various embodiments of the present invention, a VIOS SCSI target emulator supports a vendor specific inquiry page for a virtualized disk. This vendor specific inquiry page comprises server-side cache properties such as, but not limited to: an identity of an enabled cache for one or more virtualized disks, an amount of cache available to a virtualized disk, latency of one or more caching disks, the bandwidth of the one or more cache disks, etc. In various embodiments, while configuring the path, one or more clients send one or more inquiry commands to one or more VIOSs to get one or more vendor specific inquiry pages from one or more VIOS SCSIs and save the associated server-side cache properties in the metadata of one or more identified paths. In various embodiments, after configuring the paths, the one or more clients determine one or more preferred paths based on the cache properties. For example, if caching is enabled for a cache disk at only one VIOS, then that path is preferred over the other paths that do not have enabled cache and/or paths that have less preferable cache. In another example, if more than one VIOS has caching enabled for a cache disk, the client can choose the path that gives better performance based on the cache properties. In some embodiments, the one or more clients determine one or more preferred paths based on the server-side cache properties saved in the metadata of the one or more identified paths. In various embodiments, the cache stored on the metadata of a path corresponds to one particular path (e.g., the path the cache corresponds to).

However, when the preferred path fails, the one or more clients fail-over to the next preferred VIOS, wherein the one or more clients will start using the preferred path associated with the next preferred VIOS as the path for input/output (I/O) (e.g., read, write). In a particular embodiment, one or more clients can write to the same data which is cached on the failed VIOS. In this particular embodiment, the cache at the VIOS of the failed path needs to be invalidated. If the cache in the failed path's VIOS is not invalidated, there can be a data integrity issue.

Embodiments of the present invention solve the problem of data integrity issues in multi-VIOS environments when a path has failed and improves the art of data storage by: (i) enabling VIOS SCSI target emulators to support one or more vendor specific mode pages for cache invalidation; (ii) sending a cache invalidation request to one or more VIOSs on the failed path, whenever there is a path failure; (iii) marking the path as failed and marking the path as "cache invalidation in progress"; (iv) failing-over the I/O to the next preferred path; (vi) clearing a "cache invalidation in progress" flag if VIOS on the failed path responds to cache invalidation request; (vii) if VIOS on the failed path does not respond to cache invalidation request, marking the failed path as "cache invalidation needed" and sending a cache invalidation request again whenever the failed path comes online; (viii) clearing one or more cache invalidation flags on one or more failed paths whenever it sends a cache invalidation request and marking the path as "cache invalidation in progress"; (ix) clearing one or more cache invalidation flags; and/or (x) selecting one or more paths not marked "cache invalidation needed" or "cache invalidation in progress" for I/O.

FIG. 1A is a functional block diagram illustrating distributed data processing environment 100, in accordance with an embodiment of the present invention. Distributed data processing environment 100 includes computing device 110, shared storage 124 and server computer 120 interconnected over network 130. Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video information. In general, network 130 can be any combination of connections and protocols that will support communications between computing device 110, shared storage 124, and server computer 120, and any other computing devices and/or storage devices (not shown in FIG. 1A) within distributed data processing environment 100.

In various embodiments, computing device 110 can be, but is not limited to, a standalone device, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), and/or any programmable electronic computing device capable of communicating with various components and devices within distributed data processing environment 100, via network 130 or any combination therein. In general, computing device 110 is representative of any programmable mobile device or a combination of programmable mobile devices capable of executing machine-readable program instructions and communicating with users of other mobile devices via network 130 and/or capable of executing machine-readable program instructions and communicating with server computer 120.

In other embodiments, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface 106. Computing device 110 and user interface 106 can allow a user to interact with path enhancing component (PEC) 122 on server computer 120 in various ways, such as sending program instructions, receiving messages, sending data, inputting data, editing data, collecting data, and/or receiving data. In various embodiments, not depicted in FIG. 1A, computing device 110 can have one or more user interfaces. In other embodiments, not depicted in FIG. 1A environment 100 can comprise one or more computing devices.

User interface (UI) 106 provides an interface to PEC 122 on server computer 120 via network 130 for a user of computing device 110. In one embodiment, UI 106 can be a graphical user interface (GUI) or a web user interface (WUI) and can display text, documents, web browser windows, user options, application interfaces, and instructions for operation. UI 106 can include information (such as graphic, text, and sound) a program presents to a user and control sequences the user employs to control the program. In another embodiment, UI 106 can be mobile application software providing an interface between a user of computing device 110 and server computer 120. Mobile application software, or an "app," can be a computer program designed to run on smart phones, tablet computers and other mobile devices. In an embodiment, UI 106 can enable the user of computing device 110 to send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can be a laptop computer, a tablet computer, a netbook computer, a personal computer (PC), a desktop computer, a personal digital assistant (PDA), a smart phone, or any other programmable electronic device capable of communicating with computing device 110, shared storage 124, and other computing devices (not shown) within distributed data processing environment 100 via network 130. In another embodiment, server computer 120 represents a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 4.

Each of shared storage 124 and local storage 108 can be a data/knowledge repository and/or a database that can be written and/or read by one or a combination of PEC 122, server computer 120 and computing device 110. In the depicted embodiment, shared storage 124 resides in distributed data processing environment 100 and local storage 108 resides on computing device 110. In another embodiment, shared storage 124 and/or local storage 108 can reside elsewhere within distributed data processing environment 100, provided that each can access and is accessible by computing device 110, server computer 120. Shared storage 124 and/or local storage 108 can be implemented with any type of storage device capable of storing data and configuration files that can be accessed and utilized by server computer 120, such as a database server, a hard disk drive, or a flash memory. In other embodiments, shared storage 124 and/or local storage 108 can be hard drives, memory cards, computer output to laser disc (cold storage), and/or any form of data storage known in the art.

In some embodiments, shared storage 124 and/or local storage 108 can be one or more cloud storage systems and/or databases linked to a cloud network. In various embodiments, PEC 122 can search, identify, match, and/or retrieve historic information of cache properties, preferred paths, and/or failed paths that have been previously identified and/or stored on a knowledge repository (e.g., shared storage 124 and/or local storage 108). For example, PEC 122 will search and/or store the features/symptoms related to a problem (e.g., failed paths, marked paths, cache properties, etc.) on shared storage 124, in which PEC 122 can access at a later time in order to determine and/or configure one or more preferred paths. In various embodiments, the knowledge repository enables PEC 122 to be self-learning and enables PEC 122 to utilize historic data to solve an identified issue (e.g., determining if the cache at the VIOS of failed path needs to be invalidated) and/or provide a solution to the identified issue (e.g., selecting a preferred path).

In various embodiments, PEC 122 can be on one or more server computers 120 (e.g., clients/client computers). In other embodiments, PEC 122 can be instructed by one or more client computers. In various embodiments, PEC 122 can instruct and/or enable a VIOS SCSI target emulator to support one or more vendor specific inquiry pages for a virtualized disk. In various embodiments, PEC 122 can send one or more inquiry commands for one or more vendor specific pages to one or more VIOSs to retrieve server-side cache properties. Vendor specific inquiry pages comprise server-side cache properties such as: the enabled cache for one or more virtualized disks, the amount of cache available for use by a virtualized disk, latency of one or more caching disks, the bandwidth of the one or more caching disks, etc.

In various embodiments, while configuring the path, PEC 122 can send one or more inquiry commands, via one or more clients, to retrieve one or more vendor specific inquiry pages. In various embodiments, PEC 122 can store the server-side cache properties of the one or more retrieved vendor specific inquiry pages in the metadata of the one or more paths associated with the server-side cache properties (e.g., associated path(s)).

In some embodiments, the server-side cache properties and/or metadata can be stored on local storage 108 and/or shared storage 124. In various embodiments, PEC 122 configures one or more paths based on the retrieved server-side cache properties of the one or more vendor specific inquiry pages and/or metadata of one or more associated paths. In various embodiments, via one or more clients, PEC 122 can determine one or more preferred paths based on the retrieved server-side cache properties of the one or more vendor specific inquiry pages (e.g., server-side cache properties), metadata of one or more associated paths, and/or the one or more configured paths. For example, if caching is enabled for the cache disk at only one VIOS, then PEC 122 will prefer this particular path over the other paths whose cache is not enabled. In another example, if more than one VIOS has caching enabled for the cache disk, PEC 122 will choose the path that gives an enhanced performance based on the cache properties. In various embodiments, PEC 122 can rank the server-side cache properties from most effective to least effective based on the performance of the server-side cache properties and overall ability to improve the input/output (I/O) on a path. For example, the enabled cache for one or more virtualized disks can have the highest ranking/priority, the amount of cache available in a virtualized disk can have the second highest ranking/priority, latency of one or more caching disks can have the third highest ranking/priority, and the bandwidth of the one or more virtualized disks can have the fourth highest ranking/priority. In various embodiments, PEC 122 can utilize the ranking of server-side cache properties to determine the preferred path. For example, the path with the highest weighted ranking, based on the cache properties, is the most preferred path, the path with the second highest weighted ranking, based on the cache properties, is the second most preferred path, etc. In various embodiments, PEC 122 can output a descending list of server-side cache properties based on the weighted ranking of the server-side cache properties (e.g., highest weighted rank to lowest weighted rank).

In various embodiments, PEC 122 improves the art of data storage by solving the problem of data integrity issues when there is a failed path by invalidating the cached on the failed paths VIOS. In various embodiments, PEC 122 can solve the problem of data integrity issues of failed paths by instructing and/or enabling one or more VIOS SCSI target emulators to support one or more vendor specific mode page for a SCSI mode select command. In various embodiments, if PEC 122 detects, determines, and/or is alerted of a path fail, then PEC 122 can send one or more cache invalidation requests to one or more VIOSs on the failed path (e.g., send SCSI mode select command to a vendor specific mode page). In this particular embodiment, PEC 122 marks the path as failed and marks the cache of the failed path as invalidated. In various embodiments, PEC 122 fails-over the I/O to the next preferred path. In various embodiments, PEC 122 can instruct the VIOS on the failed path to invalidate the cache and submit a response to PEC 122 with completion. In various embodiments, PEC 122 clears at least one "cache invalidation in progress" flag. In some embodiments, if one or more VIOSs on the failed path do not respond with completion within a predetermined timeout period, PEC 122 can mark the path as "cache invalidation needed" and send a cache invalidation request again whenever the failed path comes online. For example, in a multipath input/output (MPIO) with health-check enabled, a device driver or PEC 122 sends a health-check command (inquiry/tur), periodically, and if the command succeeds the path is marked as online).

In various embodiments, PEC 122 can clear one or more cache invalidation flags on one or more paths whenever PEC 122 sends a cache invalidation request and marks the path as "cache invalidation in progress." In various embodiments, if cache invalidation is successful, then PEC 122 can clear one or more cache invalidation flags. In various embodiments, PEC 122 can select unmarked paths for I/O. In various embodiments, PEC 122 can return server-side caching properties for an inquiry command by one or more VIOSs; determine preferred paths based on the server-side cache properties; enable a SCSI Mode Select command to invalidate cache of a virtualized disk at a failed preferred VIOS; and/or determine and govern the use of one or more failed paths by marking the failed paths and avoiding the failed paths, even when the failed paths come back online, until the cache is invalidated on the one or more VIOSs in order to avoid data integrity issues.

Figure 1B:
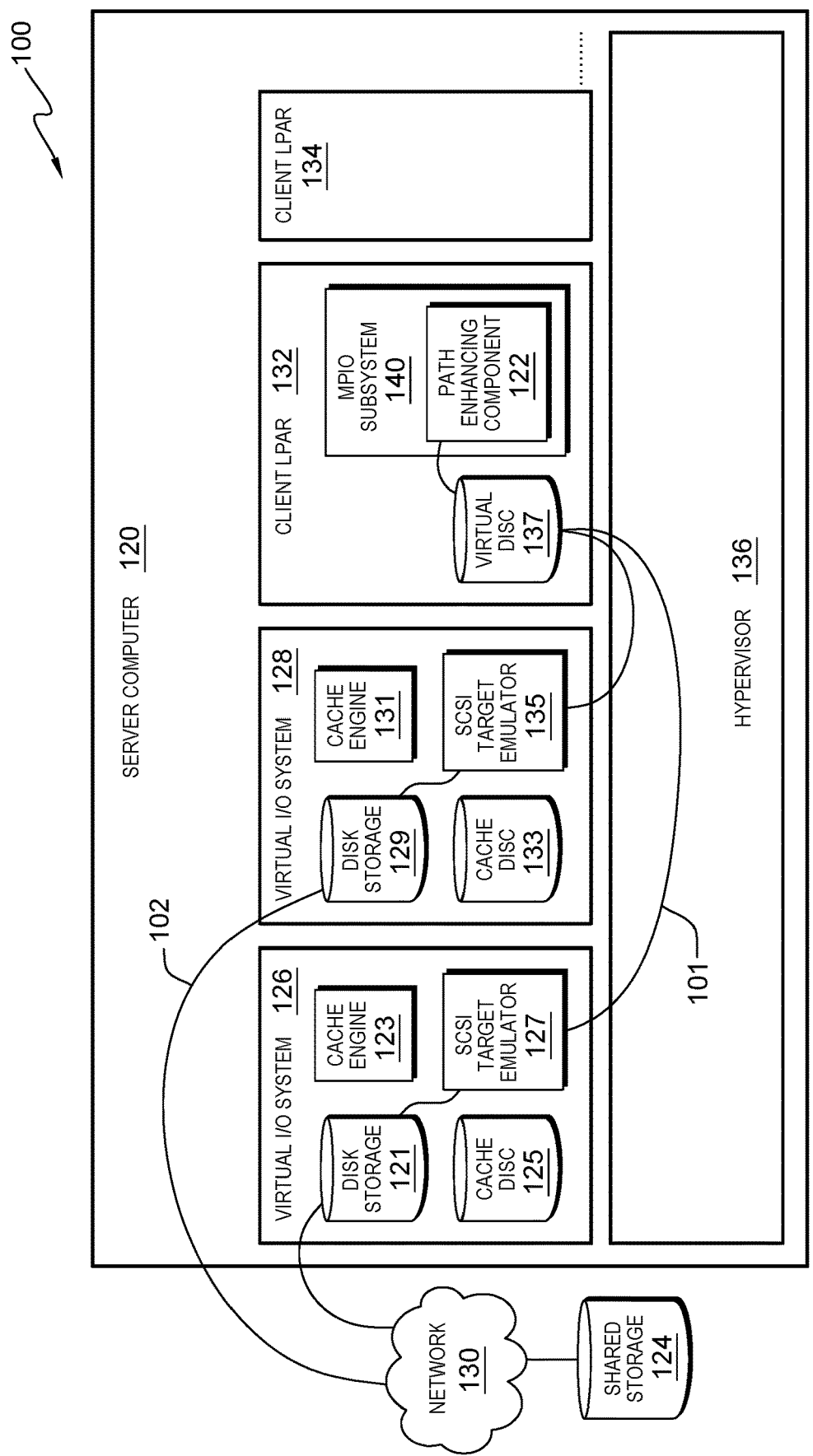
FIG. 1B is a function block diagram illustrating a server computer within the distributed data procession environment of FIG. 1A, in accordance with an embodiment of the present invention.

FIG. 1B is a function block diagram further illustrating server computer 120 within distributed data procession environment 100 shown in FIG. 1A, in accordance with an embodiment of the present invention. FIG. 1B provides only an illustration of one implementation and does not imply any limitations with regard to the environments in which different embodiments can be implemented. Many modifications to the depicted environment can be made by those skilled in the art without departing from the scope of the invention as recited by the claims.

In one particular embodiment, as depicted in FIG. 1B, shared storage 124 communicates and/or is connected to server computer 120, via network 130. In this particular embodiment, server computer 120 comprises VIOS 126, VIOS 128, client LPAR 132, client LPAR 134, and hypervisor 136; however, in other embodiments not depicted in FIG. 1B, server computer 120 can have a plurality of VIOSs, client LPAR's and/or hypervisors. In various embodiments, disk storage 121, cache disk 125, cache engine 123 and SCSI target emulator 127 reside on VIOS 126. In other embodiments, disk storage 121, cache disk 125, cache engine 123 and SCSI target emulator 127 reside anywhere in distributed data processing environment 100 as long as they are in communication with and/or connected to shared storage 124, network 130, server computer 120, VIOS 126, and/or hypervisor 136. In various embodiments, disk storage 129, cache disk 133, cache engine 131 and SCSI target emulator 135 reside on VIOS 128. In other embodiments, disk storage 129, cache disk 133, cache engine 131 and SCSI target emulator 135 can reside anywhere in distributed data processing environment 100 as long as they are in communication with and/or connected to shared storage 124, network 130, server computer 120, VIOS 128, and/or hypervisor 136. In some embodiments, VIOS 126 and VIOS 128 can have one or more disk storages, cache engines, cache disks, and/or one or more SCSI target emulators. In various embodiments, virtual disk 137 and MPIO subsystem 140 reside on client LPAR 132. In other embodiments, not depicted by FIG. 1B, virtual disk 137 and MPIO subsystem 140 can reside anywhere in distributed data processing environment 100 as long as they are in communication with and/or connected to shared storage 124, network 130, server computer 120, client LPAR 134, and/or hypervisor 136.

MPIO subsystem 140 is a device driver designed to support a multipath I/O configuration. In various embodiments, PEC 122 can reside on MPIO subsystem 140; however, in other embodiments, not depicted in FIG. 1B, PEC 122 can reside anywhere on server computer 120, and/or anywhere in distributed data processing environment 100 as long as PEC 122 is in communication with and/or connected to shared storage 124, network 130, server computer 120, VIOS 126, VIOS 128, Client LPAR 132, Client LPAR 134 and/or hypervisor 136. Client LPAR 132 and client LPAR 134 are a subset of a computer's hardware resources (e.g., server computer 120), virtualized as a separate computer. In effect, a physical machine can be partitioned into multiple logical machines, each hosting a separate instance of an operating system and each of these machines is a client LPAR (e.g., client LPAR 132 and client LPAR 134). In various embodiments, client LPAR 132 can have one or more virtual disks. In various embodiments, not depicted in FIG. 1B client LPAR 132 can have one or more virtual disks, and/or one or more MPIO subsystems. SCSI target emulator 127 and SCSI target emulator 135 can simulate the behavior of a SCSI target for processing and responding to I/O requests issued by initiators in a storage area network (SAN) environment. In various embodiments, SCSI target emulator 127 and SCSI target emulator 135 can work with general storage devices (e.g., shared storage 124, disk storage 121, disk storage 129, and virtual disk 137). Disk storage 121 and disk storage 129 are storage mechanisms where data is recorded by various electronic, magnetic, optical, and/or mechanical changes to a surface layer of one or more rotating disks.

Cache disk 125 and cache disk 133 are mechanisms for improving the time it takes to read from or write to a hard disk. Cache disk 125 and cache disk 133 can be a part of the hard disk. Further, cache disk 125 and cache disk 133 can also be a specified portion of random access memory (RAM). In general, cache disks (e.g., cache disk 125 and cache disk 133) can hold data that has recently been read and, in some cases, adjacent data areas that are likely to be accessed next. Cache engine 123 and cache engine 131 can be dedicated network servers or services acting as a server that save Web pages or other Internet content locally by placing previously requested information in temporary storage, i.e., cache. Cache engine 123 and cache engine 131 can both speed up access to data and reduce demand on an enterprise's bandwidth. Cache engine 123 and cache engine 131 can also enable users to access content offline, including media files or other documents. Virtual disk 137 can emulate an actual disk storage device, such as an optical disc drive, a floppy disk drive, or a hard disk drive. To other programs, a virtual drive looks and behaves like an actual physical device. Virtual disk 137 can be in any of the following forms: a disk image, a computer file that contains the exact data structure of an actual storage device; a logical disk (also known as vdisk), an array of two or more actual drives that cooperatively act like a single device; and/or a random-access memory (RAM) disk, which stores its data in RAM instead of on a storage device. Hypervisor 136 can be computer software, firmware, or hardware that creates and runs virtual machines. Hypervisor 136 can run one or more virtual machines and present guest operating systems with a virtual operating platform and manage the execution of the guest operating systems.

In one particular embodiment, as depicted in FIG. 1B, I/O path 101 can flow through virtual disk 137, hypervisor 136, SCSI target emulator 127, disk storage 121, network 130, and/or shared storage 124 and vice versa. In this particular embodiment, I/O path 102 can flow through virtual disk 137, hypervisor 136, SCSI target emulator 135, disk storage 129, network 130, and/or shared storage 124 and vice versa. In various embodiments, PEC 122 can determine a preferred path for I/O based on server-side cache properties. For example, a client needs to write some data onto shared storage 124. In this particular embodiment, client LPAR 132, via PEC 122, sends an inquiry command to VIOS 126 on path 101 and VIOS 128 on path 102 requesting server-side cache properties. In this particular embodiment, VIOS 126 retrieves the server-side cache properties from cache disk 125 and VIOS 128 retrieves the server-side cache properties from cache disk 133 and both VIOSs send the server-side cache properties to PEC 122.

In this particular embodiment, PEC 122 evaluates both paths by reading the server-side cache properties of each path and calculating the path rankings based on the respective cache properties. In this particular embodiment, PEC 122 determines and selects path 102 as the preferred I/O path because the cache is enabled for VIOS 128, and because of lower latency in cache disk 133; whereas, the cache was not enabled in VIOS 126 or the latency of cache disk 125 was far greater than that of cache disk 133.

Figure 2:
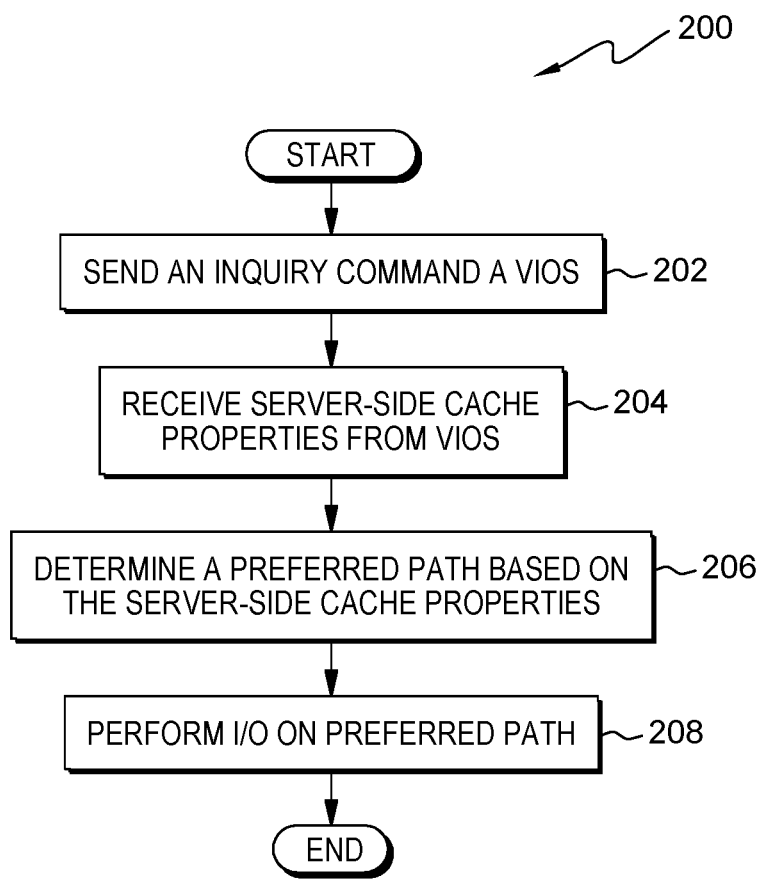
FIG. 2 is a flowchart illustrating operational steps of a path enhancing component, on a server computer within the distributed data processing environment of FIG. 1A, for input/output selection based on server-side cache properties, in accordance with an embodiment of the present invention.

FIG. 2 is a flowchart illustrating operational steps of PEC 122, generally designated 200, on server computer 120 within distributed data processing environment 100 of FIG. 1A, for input/output selection based on server-side cache properties, in accordance with an embodiment of the present invention. FIG. 2 provides an illustration of one implementation and does not imply any limitations with regard to the environments in which different embodiments can be implemented. Many modifications to the depicted environment can be made by those skilled in the art without departing from the scope of the invention as recited by the claims.

In step 202, PEC 122 can send an inquiry command to a VIOS. In various embodiments, PEC 122 can send one or more inquiry commands to one or more VIOSs (e.g., VIOS 126 and/or VIOS 128) requesting one or more vendor specific inquiry pages to receive server-side cache properties. For example, PEC 122 can send an inquiry command to VIOS 126 and/or VIOS 128.

In step 204, PEC 122 receives server-side cache properties from the VIOS. In various embodiments, PEC 122 can receive one or more server-side cache properties from one or more VIOSs. For example, PEC 122 can receive one or more server-side cache properties from VIOS 126 and/or VIOS 128.

In step 206, PEC 122 determines a preferred path based on the server-side cache properties. In various embodiments, PEC 122 can determine one or more preferred paths based on the received server-side cache properties submitted by the one or more VIOSs. For example, VIOS 126 and VIOS 128 each send their associated server-side cache properties to PEC 122. More specifically, VIOS 126 sends the service-side cache properties associated with path 101 and VIOS 128 sends the server-side cache properties associated with path 102 to PEC 122. In various embodiments, each server-side cache property can have a predetermined ranking, priority number, and/or value, which PEC 122 can utilize to calculate and determine one or more preferred paths. For example, the enabled cache for one or more virtualized disks can have the highest value, the amount of cache available in a virtualized disk can have the second highest value, latency of one or more caching disks can have the third highest value, and the bandwidth of the one or more virtualized disks can have the fourth highest value. In this particular example, the path with the highest weighted calculated value, based on the cache properties, is the preferred path. In other embodiments, PEC 122 can output a list of preferred paths. For example, the path with the highest weighted calculated value is preferred path 1, the path with the second highest calculated value is preferred path 2, etc.

In step 208, PEC 122 performs I/O on the preferred path. In various embodiments, PEC 122 can perform I/O on the one or more preferred paths.

Figure 3:
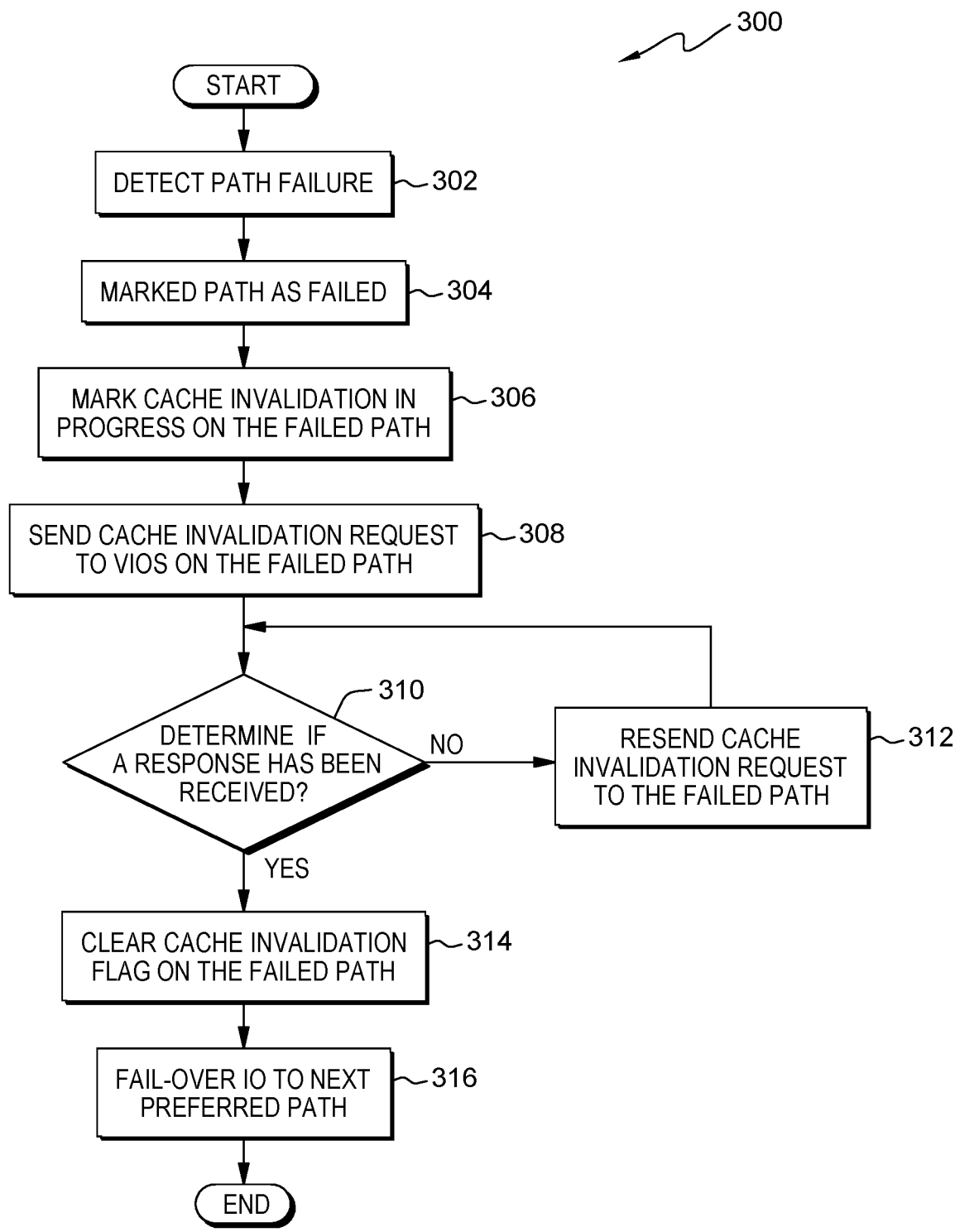
FIG. 3 is a flowchart illustrating operational steps of a path enhancing component, on a server computer within the distributed data processing environment of FIG. 1A, for path-failover, in accordance with an embodiment of the present invention.

FIG. 3 is a flowchart illustrating operational steps of PEC 122, generally designated 300, on a server computer within the distributed data processing environment of FIG. 1A, for path-failover, in accordance with an embodiment of the present invention. FIG. 3 provides only an illustration of one implementation and does not imply any limitations with regard to the environments in which different embodiments can be implemented. Many modifications to the depicted environment can be made by those skilled in the art without departing from the scope of the invention as recited by the claims.

In step 302, PEC 122 detects a path failure. In various embodiments, PEC 122 can determine that one or more I/O paths have failed. In various embodiments, PEC 122 can determine if one or more paths have failed by monitoring the one or more paths, being alerted that the one or more paths have failed, and/or detecting that the one or more paths have failed. For example, PEC 122 receiving a failed data transfer notification and/or system error.

In step 304, PEC marks the path as failed. In various embodiments, PEC 122 can mark the one or more detected failed paths as a failed path.

In step 306, PEC 122 marks the failed path as "cache invalidation in progress." In various embodiments, PEC 122 can mark one or more detected and/or marked failed paths as "cache invalidation in progress."

In step 308, PEC 122 sends a cache invalidation request to the VIOS on the failed path. In various embodiments, PEC 122 can send one or more cache invalidation requests to one or more VIOSs on the one or more failed paths. For example, if PEC 122 detects path 101 has failed and PEC 122 marks the path as failed (e.g., marking the cache on path 101) then PEC 122 sends a cache invalidation request to VIOS 126 requesting VIOS 126 to invalidate the cache on the marked path to avoid data integrity issues. In another example, PEC 122 can clear the cache on the marked path to avoid data integrity issues. In some embodiments, one or more VIOSs can clear the cache associated with the cache invalidation request. In various embodiments, PEC 122 can use SCSI in-band communication to send one or more cache invalidation requests from a guest operating system (OS) to one or more VIOSs on the one or more failed paths.

In decision step 310, PEC 122 determines if a response has been received. In various embodiments, PEC 122 can determine if one or more responses (e. g., completion response(s)) to the one or more cache invalidation request have be received from the one or more VIOSs. In some embodiments, if one or more VIOSs on the one or more failed paths do not respond with completion within a predetermined timeout period ("No" branch, decision step 310), PEC 122 can mark the path as "cache invalidation needed" and proceed to step 312. In step 312, PEC 122 can resend a cache invalidation request to the failed path. In various embodiments, PEC 122 can resend one or more cache invalidation requests to one or more VIOSs on one or more failed path. In various embodiments, PEC 122 can detect when the one or more failed paths are online and can resend the cache invalidation request to the one or more failed paths (e.g., VIOSs) that have not responded once the one or more paths are back online. For example, in a multipath input/output (MPIO) subsystem 140 of FIG. 1B, if "healthcheck" is enabled, then a device driver or PEC 122 sends a "healthcheck" command periodically and if the command succeeds, then the path is marked as online. In this particular embodiment, PEC 122 repeats steps 310 and 312 until PEC 122 determines one or more VIOSs have submitted a response with completion. If PEC 122 receives one or more completion responses to the one or more cache invalidation requests ("Yes" branch, decision step 310), then PEC 122 can advance to step 314.

In step 314, PEC 122 clears the cache invalidation flag (e.g., "cache invalidation in progress") on the failed path. In various embodiments, PEC 122 can clear the cache invalidation flag on the one or more failed paths. In various embodiments, not depicted in FIG. 3, PEC 122 can end after step 314. In other embodiments, PEC 122 can advance to step 316.

In step 316, PEC performs an I/O fail-over to the next preferred path. In various embodiments, PEC 122 can fail-over one or more I/Os to the one or more next preferred paths. For example, if a path fails then one or more clients will search for available paths to the one or more virtual disks previously accesses by the failed path. In this particular example, PEC 122 looks for one or more preferred paths using an inquiry command, based on the server-side cache properties of VIOS 126 that were collected when the paths were configured. In another example, PEC 122 can fail-over I/O to the next preferred path based on a ranking list (e.g., the path with the next highest calculated value). In some embodiments, not depicted in FIG. 3, PEC 122 can skip steps 310-314 and simply perform steps 302-308 and step 316.

Figure 4:
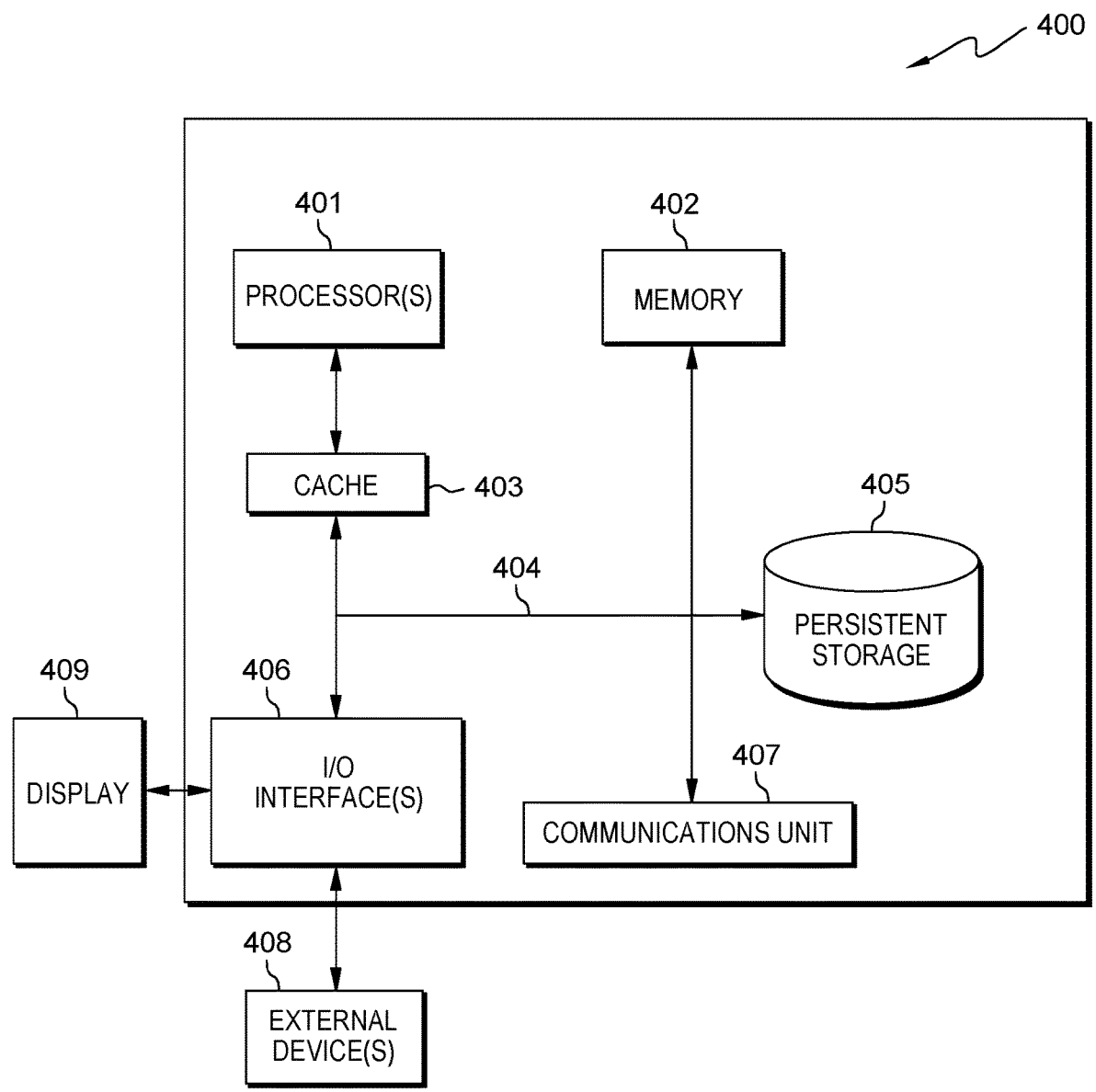
FIG. 4 depicts a block diagram of components of a computing device and a server computer of the distributed data processing environment of FIG. 1A, in accordance with an embodiment of the present invention.

FIG. 4 depicts a block diagram of components of computing device 110 and server computer 120 of distributed data processing environment 100 of FIG. 1A, in accordance with an embodiment of the present invention. FIG. 4 depicts computer system 400, where server computer 120 represents an example of computer system 400 that includes PEC 122. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for improving path selection in multi-virtual input/output server environment, the method comprising:
receiving, by the one or more processors, one or more server-side cache properties from one or more virtual input/output server's (VIOSs);
determining, by the one or more processors, one or more preferred paths based on the one or more server-side cache properties;
calculating, by the one or more processors, a value for the one or more server-side cache properties, wherein the one or more server-side cache properties have a predetermine value;

ranking, by the one or more processors, the one or more preferred paths from highest to lowest preference based on the calculated value of the one or more server-side cache properties; and outputting, by the more or more processors, a list of the one of more server-side cache properties based on the ranking.

2. The method of claim 1 further comprising:

detecting, by the one or more processors, path failure in one or more paths; and marking, by the one or more processors, the one or more detected failed paths.

3. The method of claim 2 further comprising:

marking, by the one or more processors, one or more cache invalidation in progress on the one or more failed paths; and sending, by the one or more processors, one or more cache invalidation requests to the one or more VIOSs.

4. The method of claim 3 further comprising:

determining, by the one or more processors, the one or more VIOS's have responded with completion to the one or more invalidation requests.

5. The method of claim 4 further comprising:

clearing, by the one or more processors, one or more cache invalidation flag on the one or more failed paths; and failing over, by the one or more processors, the one or more I/O's onto the next preferred path.

6. The method of claim 3 further comprising:

determining, by the one or more processors, the one or more VIOS's have not responded with completion to the one or more invalidation requests;

detecting, by the one or more processors, when the failed paths are back online;

resending, by the one or more processors, the one or more cache invalidation requests when the failed paths are back online;

clearing, by the one or more processors, one or more cache invalidation flag on the one or more failed paths; and failing over, by the one or more processors, the one or more I/O's onto the next preferred path.

7. A method for improving path selection in multi-virtual input/output server environment, the method comprising:

marking, by the one or more processors, one or more detected failed paths;

marking, by the one or more processors, cache on the detected one or more failed paths;

sending, by the one or more processors, one or more cache invalidation requests to one or more virtual input/output servers (VIOSs);

determining, by the one or more processors, the one or more VIOS's have not responded with completion to the one or more invalidation requests;

detecting, by the one or more processors, when the failed paths are back online;

resending, by the one or more processors, the one or more cache invalidation requests when the failed paths are back online;

clearing, by the one or more processors, the marked cache and the cache invalidation requests on the one or more failed paths; and failing over, by the one or more processors, the one or more I/O's onto the next preferred path.

8. The method of claim 7 further comprising:

determining, by the one or more processors, the one or more VIOS's have responded with completion to the one or more invalidation requests.

9. The method of claim 7 further comprising:

clearing, by the one or more processors, one or more cache invalidation flag on the one or more failed paths; and failing over, by the one or more processors, the one or more I/O's onto the next preferred path.

10. The method of claim 7 further comprising:

sending, by one or more processors, one or more inquiry commands to one or more virtual input/output server's (VIOSs); and receiving, by the one or more processors, one or more server-side cache properties from the one or more VIOSs.

11. The method of claim 10 further comprising:

determining, by the one or more processors, one or more preferred paths based on the one or more server-side cache properties; and performing, by the one or more processors, one or more input/outputs (I/Os) on the one or more preferred paths.

12. The method of claim 11, wherein determining one or more preferred paths further comprises:

calculating, by the one or more processors, a value for the one or more server-side cache properties, wherein the one or more server-side cache properties have a pre-determine value;

ranking, by the one or more processors, the one or more preferred paths from highest to lowest preference based on the calculated value of the one or more server-side cache properties; and outputting, by the more or more processors, a list of the one of more server-side cache properties based on the ranking.

13. A computer system for improving path selection in multi-virtual input/output server environment, the computer system comprising:

one or more computer processors;

one or more computer readable storage devices;

program instructions stored on the one or more computer readable storage devices for execution by at least one of the one or more computer processors, the stored program instructions comprising:

program instructions to receive one or more server-side cache properties from one or more virtual input/output server's (VIOSs);

program instructions to determine one or more preferred paths based on the one or more server-side cache properties;

program instructions to calculate a value for the one or more server-side cache properties, wherein the one or more server-side cache properties have a predetermine value;

program instructions to rank the one or more preferred paths from highest to lowest preference based on the calculated value of the one or more server-side cache properties; and program instructions to output a list of the one of more server-side cache properties based on the ranking.

14. The computer system of claim 13 further comprising:

program instructions to detect path failure in one or more paths; and program instructions to mark the one or more detected failed paths.

15. The computer system of claim 14 further comprising:
program instructions to mark one or more cache invalidation in progress on the one or more failed paths; and
program instructions to send one or more cache invalidation requests to the one or more VIOSs.

16. The computer system of claim 15 further comprising:
program instructions to determine the one or more VIOS's have responded with completion to the one or more invalidation requests
program instructions to clear one or more cache invalidation flag on the one or more failed paths; and
program instructions to fail over the one or more I/O's onto the next preferred path.

17. The computer system of claim 15 further comprising:
program instructions to determine the one or more VIOS's have not responded with completion to the one or more invalidation requests;
program instructions to detect when the failed paths are back online;
program instructions to resend the one or more cache invalidation requests when the failed paths are back online;
program instructions to clear one or more cache invalidation flag on the one or more failed paths; and
program instructions to fail over the one or more I/O's onto the next preferred path.

18. The method of claim 1, wherein the list of the one of more server-side cache properties is descending list of the one of more server-side cache properties output a descending list of server-side cache properties based on the weighted ranking of the server-side cache properties.

19. The method of claim 7, wherein the list of the one of more server-side cache properties is descending list of the one of more server-side cache properties output a descending list of server-side cache properties based on the weighted ranking of the server-side cache properties.

20. The computer system of claim 13, wherein the list of the one of more server-side cache properties is descending list of the one of more server-side cache properties output a descending list of server-side cache properties based on the weighted ranking of the server-side cache properties.

* * * * *